Figure 1:
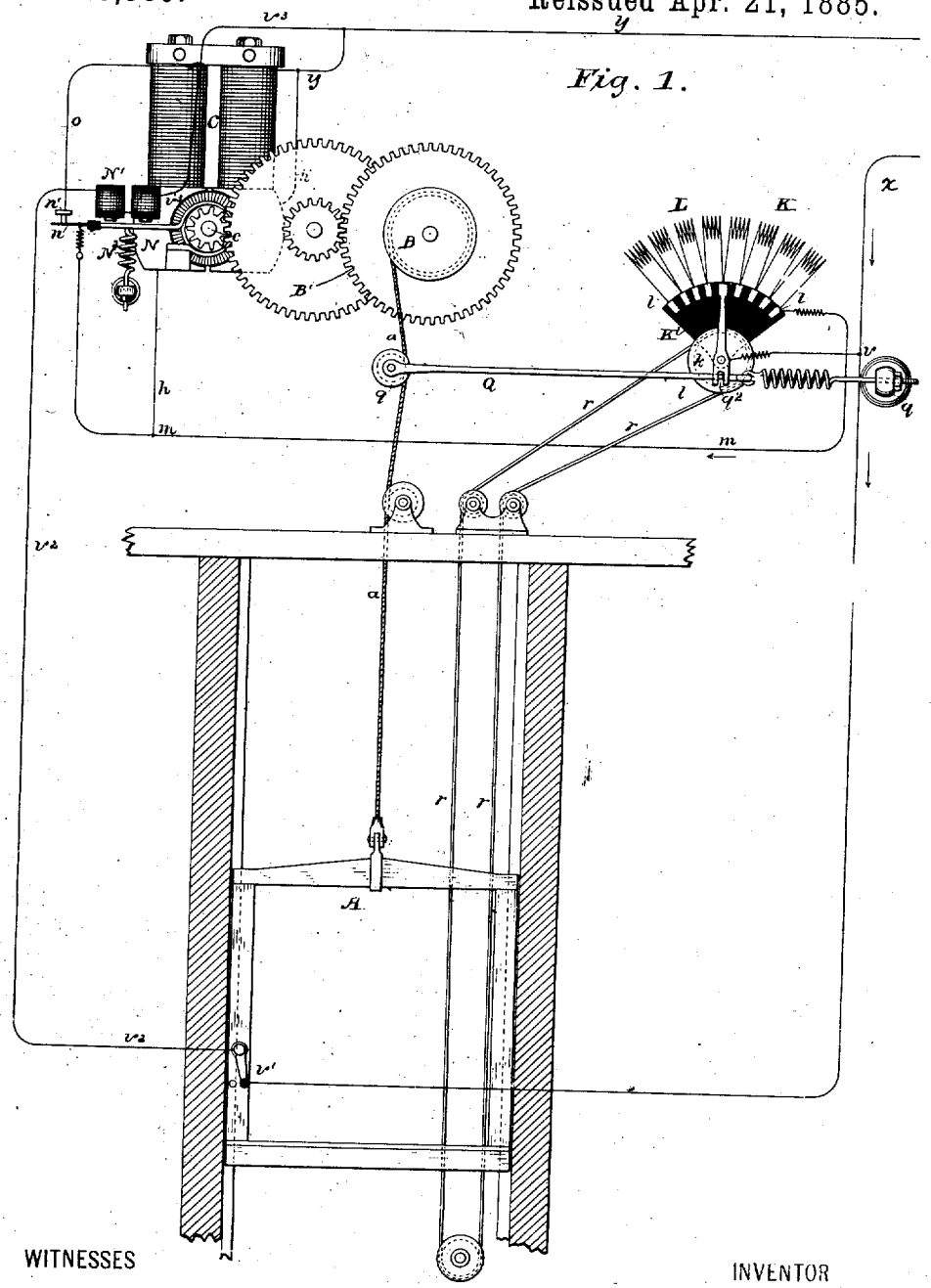

2 Sheets—Sheet 1.

S. S. WHEELER.

Assignor to C. A. CHEEVER, trustee.

ELECTRIC ELEVATOR.

No. 10,585. Reissued Apr. 21, 1885.

WITNESSES

Ed. A. Newman.
A. C. Newman.

INVENTOR

Schuyler S. Wheeler.

By his Attorneys

Baldwin, Hopkins & Peyton

2 Sheets—Sheet 2.
S. S. WHEELER.
Assignor to C. A. CHEEVER, trustee.
ELECTRIC ELEVATOR
No. 10,585. Reissued Apr. 21, 1885.
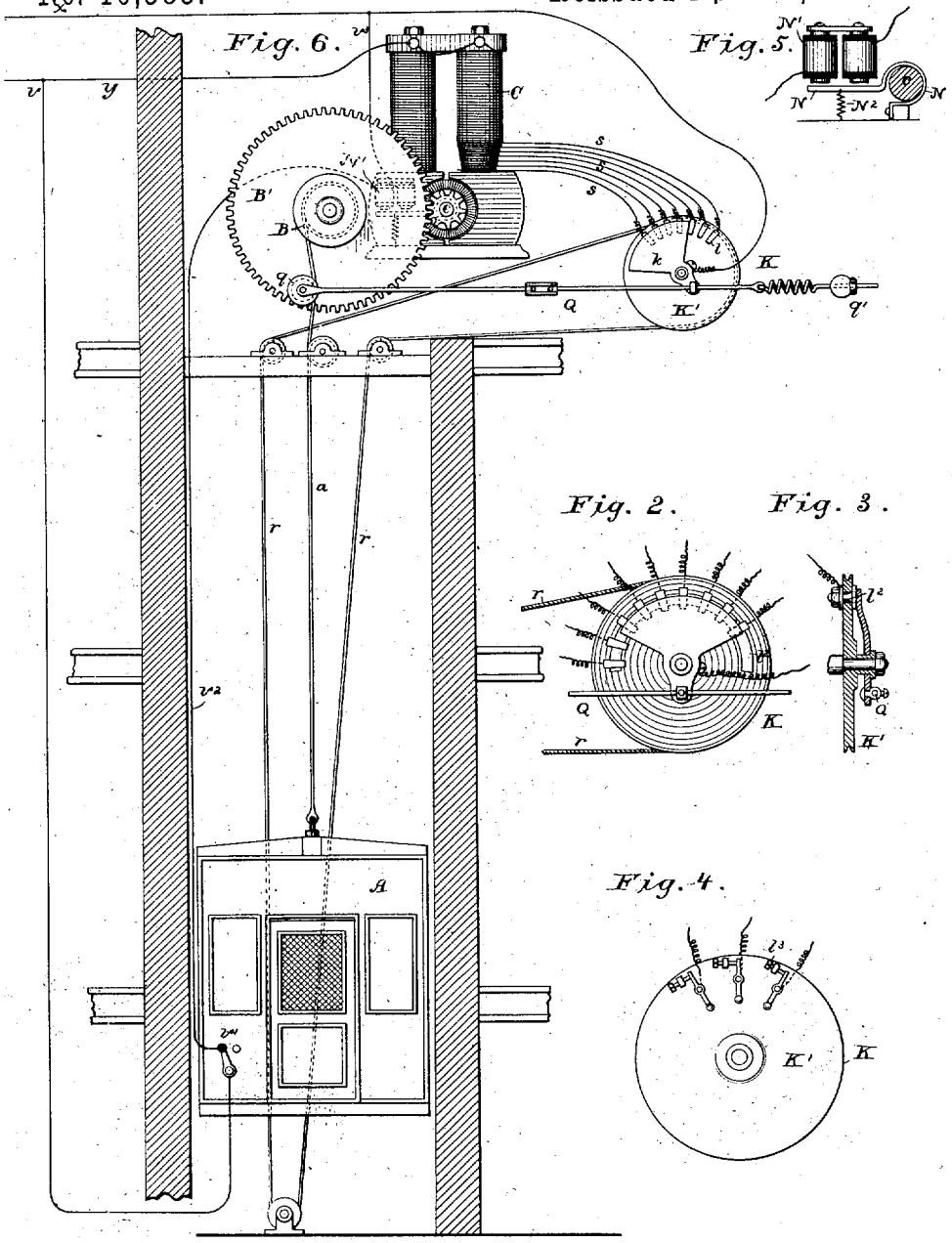
WITNESSES
Ed. A. Newman.
Al. C. Newman.
INVENTOR
Schuyler S. Wheeler.
By his Attorneys
Baldwin, Hopkins & Peyton

UNITED STATES PATENT OFFICE.

SCHUYLER S. WHEELER, OF NEWBURG, ASSIGNOR TO CHARLES A. CHEEVER, TRUSTEE, OF NEW YORK, N. Y.

ELECTRIC ELEVATOR.

SPECIFICATION forming part of Reissued Letters Patent No. 10,585, dated April 21, 1885.

Original No. 273,208, dated February 27, 1883. Application for reissue filed December 26, 1884.

*To all whom it may concern:*

Be it known that I, SCHUYLER S. WHEELER, a citizen of the United States, residing in the city of Newburg, county of Orange, and State of New York, have invented certain new and useful Improvements in Electric Elevators, of which the following is a specification.

The invention consists in certain novel apparatus for running and controlling the elevator, all of which are fully set forth below.

In the accompanying drawings, Figures 1 and 6 are diagrammatic sectional elevations showing the manner of carrying out my invention. Figs. 2, 3, and 4 are detail views showing the construction of one form of my improved controlling-switch; and Fig. 5 is a detail view of the brake mechanism.

In the drawings I have shown my invention organized in connection with a vertical elevator raised and lowered in an upright guideway.

In Figs. 1 and 6 the elevator-cage A, travels in a suitable guide or frame, and is suspended by a cable, *a*, from a drum or shaft, B, connected by suitable gearing, B′, with the revolving armature-carrying shaft *c* of a suitable electro-dynamic motor, C. This motor is connected in the usual way with any source of electric energy. The wires leading to the generator are marked *x* and *y* in the drawings. Referring now to Fig. 1, which shows an organization differing in detail merely from that indicated in Fig. 6, the current from the source of electric energy comes in by the wire *x* and passes to a pivoted moving switch-arm, *k*, from this arm to one of a series of contacts, *l*, through one or more of the resistance-coils L and wire *m* to the tongue *n* on the brake-lever N, contact-stop *n′*, wire *o*, through the coils of the field-magnet of the motor, and by wire *v* to the other pole of the source of electric energy. The armature of the motor is included in a branch, *h*. A branch or multiple-arc circuit of comparatively high resistance, in which the coils of the brake-magnet N′ are included, is thrown around the switch K and motor C. This circuit branches from the main line *x* at the point *v*, passes through a suitable switch, *v′*, on the car or cage of the elevator, then by wire $v^2$ through the coils of the brake-magnet N′, and by wire $v^3$ back to the main line *y*. With the switch *v′* closed, so as to complete this branch circuit, as indicated in the drawings, a current of electricity will always pass through the brake-magnet N′ of sufficient strength to hold the brake-lever up against the force of its spring $N^2$ and maintain the continuity of the main circuit between the contacts *n n′*, above mentioned.

The brake mechanism is illustrated particularly in Fig. 5, where it is shown as consisting of an elastic metal band or flat bar, N, which is bent part way around the shaft *c* of the motor. Its elongated end or arm constitutes the armature for the magnet N′. Normally the brake is drawn down by its spring $N^2$, so as to cause it to grip the shaft and stop the motor. When the branch circuit, however, is completed, the magnet N′ draws up the brake-arm N against the force of its spring and releases the grip of the brake upon the motor-shaft. The special form of brake, however, is immaterial so long as it fulfills the requirements of the organization. With this branch circuit completed, therefore, as above described, the brake will be taken off the motor-shaft, the main-line circuit will be completed through the contacts *n n′*, and the apparatus will be free to operate. Under these conditions it will be obvious that a current of electricity, coming in over the line *x*, as above described, and passing through the switch K and the coils of the motor, will actuate the motor, causing its shaft *c* to revolve, and through the gearing B′ wind the cable *a* on the hoisting-drum and elevate the cage.

I will now describe the manner of controlling the action of the elevator and of automatically adjusting the power of the motor to balance any weight that may be put on the cage.

The switch K (illustrated in Fig. 1) consists of a base or quadrant, K′, around the edge of which are placed a series of contacts, *l*, electrically connected by a series of resistance-coils, L, the contact and end of the coil at one side of the quadrant being electrically connected with the main-line wire *m*. The moving switch-arm *k* vibrates upon the center from which the quadrant is struck, and is actuated in the following manner: A looped bar, Q, through which the lifting-cable *a* passes, is provided with a pulley, $q$, against which the cable works. The opposite end of the bar Q is connected by a coil-spring with an eye-rod, $q'$, which passes through a stud, and can be adjusted by a nut, as shown in the drawings, to draw the pulley $q$ against the lifting-cable and deflect the cable out of a right line, as indicated in the drawings. A cross-pin, $q^2$, on the rod Q is straddled by the forked end of the switch-arm $k$, so that any endwise motion of the rod Q will rock the switch-arm on its pivot and cause it to pass over the face of the quadrant and make contact with the series of contact-points $l$. Of course the parts should be so proportioned that the arm $k$ will not leave one contact $l$ until it has made contact with the adjoining one, so that the circuit will not be broken. With this organization it will be obvious that an increased strain on the cable $a$, which will of course be proportional to the weight of the car, will swing the switch-arm upon its pivot, and, cutting out one or more of the resistances L, will permit a greater current to pass, and will correspondingly increase the power of the motor, so that it will sustain the car. In order, now, to further increase the power of the motor to elevate the car, the quadrant-base K′ of the switch is also pivoted upon the same center as the arm $k$, and is provided with a pulley over which an endless pull-rope, $r$, passes. This rope runs over suitable pulleys and through apertures in the elevator-cage, after the ordinary manner in elevators. The operator in the cage, by pulling upon this rope, can swing the quadrant K′ on its pivot, so as to throw in or out a greater or less resistance. If the car is to ascend with a load, the quadrant may be swung by means of the pull-rope $r$ to cut out some of the resistance in the circuit and increase the supply of current to the motor until the desired speed of ascent is attained. When the car has risen to the desired point, the power of the motor can in like manner be reduced so as to balance the weight of the load, when the car will of course remain stationary. When the car is descending, the operator manipulates the rope $r$ to throw in an increased resistance until the motor becomes too weak to sustain it, when it will commence to descend. The descent of the car will, under the organization shown, drive the motor-shaft $b$ in the opposite direction and generate a current of electricity in the same direction as that received from the source of electric energy. The brake-circuit will still take its current in the same direction and hold the brake out of action. Of course the operator, by manipulating the rope $r$, may control the speed of descent and stop and start as desired.

In Fig. 6 the general arrangement of the parts indicated by similar letters is the same as that just described in connection with Fig. 1, except the difference in the construction of the switch and the manner of increasing and decreasing the power of the motor. In this figure the base K′ of the switch is provided with a series of contacts, $l$, to which are connected a series of wires, $s$, which are wound together or multiply around the stationary magnets of the motor, as clearly indicated in the drawings. The switch-arm $k$ is shown as a rocking quadrant, and is connected up in circuit and operated in the same manner as shown in Fig. 1. The base K′ of the switch is also operated by a pull-rope passing through the elevator-cage, as just described. The brake-magnets are connected up in branch circuit in the same manner as in Fig. 1, as will appear on tracing the circuit by means of the letters $v$ $v'$ $v^2$. The strain of the cable $a$ upon the rod Q operates to swing the switch-arm $k$ and throw in a greater or less number of circuits $s$, which pass around the magnets of the motor, and thus increase or decrease the power of the motor according to the weight in the cage, to which the strain on the cable is of course proportional. In Fig. 2 the contacts $l$ are carried by short bolts, which may be moved in a slot, $l^2$, in the base of the switch, and clamped at any desired point by means of set-nuts. By this means the contacts—of which there may be any suitable number, and of which there may be more than are indicated in the drawings—may be adjusted toward or from each other. Another arrangement for accomplishing the adjustment of the contacts is shown in Fig. 4, where the contacts $l$ form the ends of pivoted levers, which may be adjusted by thumb-screws $l^3$. The details, however, may of course be varied, the broad principle of the invention being in no way dependent upon them. The purpose of having the contacts movable is that by experimentally adjusting them the apparatus may be brought to just the condition desired without difficulty. The adjustment of the rod Q serves a similar purpose, and both means may be used together. A like adjustment of the contacts $l$ may be provided in the organization shown in Fig. 1. Under the organization shown in this figure (6) the too rapid descent of the car is prevented by manipulating the pull-rope and causing a greater current to pass through the stationary magnets of the motor, so that the speed of descent as well as ascent can be perfectly controlled.

In both organizations shown in Figs. 1 and 6, when the apparatus is not working, the switch $v'$ in the cage is moved so as to interrupt the brake-circuit, and permit the lever N, acting by the force of its spring, to grip the motor-shaft and lock all the parts firmly. The movement of the brake-lever N interrupts the main-line circuit at $n$ $n'$ and takes the power off the motor. When the switch $v'$ is closed and the apparatus is working or ready for working, there must at all times be a current through the brake-circuit in the same direction to constantly hold up the brake-lever, and always maintain the continuity of the main circuit at the points $n$ $n'$, whether the car is ascending or descending. This I accomplish by placing the brake-magnets in a branch circuit of very high resistance around the motor C, as above described, and proportioned with reference to the conditions of the circuit.

I claim as my invention—

1. The combination, substantially as set forth, of the main-line or generator circuit, an electric motor placed therein, a car, cage, or vehicle which is hoisted by the motor when the motor is driven in one direction, but which in descending drives the motor in the opposite direction, and mechanism under the control of the attendant in the car for increasing or decreasing the electric capacity of the motor-circuit, so as to increase or decrease the resistance of the motor to being thus driven by the descending car, whereby the speed of descent of the car may be regulated, as described.

2. The combination of the main-line or generator wires, the electric motor placed therein, the car, cage, or vehicle for raising and lowering matter, mechanism for automatically increasing or decreasing the power of the motor in proportion to the weight placed upon the car, for the purpose set forth, and mechanism to further increase or decrease the power of the motor, at the will of the operator, to raise or lower the car.

3. The combination of the main-line or generator wires, the electric motor placed therein, the car, cage, or vehicle to be raised or lowered by the motor, the switch having the moving base and moving switch-arm, means for automatically moving the switch-arm to vary the power of the motor, as set forth, to automatically increase or decrease the power of the motor proportionately to the weight thrown upon the car, and means under the control of the operator for moving the base of the switch to further increase or decrease the power of the motor to raise or lower the car.

4. The combination, substantially as set forth, of the main-line or generator wires, the electric motor placed therein, the car, cage, or vehicle to be raised and lowered by the motor, switch mechanism for automatically increasing or decreasing the power of the motor proportionately to the load thrown upon it, for the purpose set forth, means for adjusting such switch mechanism, and switch mechanism under the control of the operator for further increasing or decreasing the power of the motor to raise or lower the car.

5. The combination of an electric circuit and the two-part switch, each part of which is independently movable, a series of contacts on one part of the switch over which the other part of the switch moves, and means for increasing or decreasing the capacity of the electric circuit in response to the movement of either part of the switch.

6. The two-part switch consisting of the pivoted moving base carrying a series of contacts and mechanism for adjusting them toward or from each other, and the pivoted moving switch-arm.

7. The combination of the main-line or generator circuit, the electric motor placed therein, a car, cage, or vehicle which is raised by the motor and which in its descent reverses the direction of the motor, brake apparatus, and a branch circuit thrown around the motor, in which circuit the coils of the brake-controlling magnets are placed, for the purpose set forth.

8. The combination of the main-line or generator wires, the electric motor placed therein, the car and cable, the hoisting-drum driven by the motor, mechanism for controlling the power of the motor, and the bar or rod Q, on which the strain of the cable is exerted, which operates the controlling mechanism and automatically increases or decreases the power of the motor proportionately to the strain upon the cable.

9. The combination of the main-line or generator wires, the electric motor placed therein, the car and cable, the hoisting-drum driven by the motor, mechanism for controlling the power of the motor, the bar or rod Q, on which the strain of the cable is exerted, which operates the controlling mechanism and automatically increases or decreases the power of the motor proportionately to the strain upon the cable, and means for adjusting the rod.

In testimony whereof I have hereunto subscribed my name at Newburg, New York, November 29, 1884.

SCHUYLER S. WHEELER.

Witnesses:
W. WADSWORTH,
GEO. B. CARVER.